United States Patent Office 2,785,137
Patented Mar. 12, 1957

2,785,137

LUMINESCENT MATERIALS

Peter Whitten Ranby, London, England, assignor to Thorn Electrical Industries Limited, London, England, a British company No Drawing. Application November 6, 1952,
Serial No. 319,188

4 Claims. (Cl. 252—301.4)

This invention relates to luminescent materials for use in fluorescent discharge lamps, high pressure mercury vapour discharge lamps and in the formation of cathode ray tube screens, and an object of the invention is to provide new luminescent materials.

We have discovered that useful luminescent materials can be produced comprising a matrix of the elements magnesium, lithium, antimony and oxygen, the matrix being activated by manganese or uranium or both.

According to the present invention there is provided a method of preparing an artificial luminescent material including the step of heat treating an initial mixture comprising the oxides, or compounds which decompose to the oxides on the heat treatment, of magnesium, lithium and antimony, and a compound of manganese or uranium or both, the proportions by weight of the elements magnesium, lithium, antimony and oxygen present in the initial mixture, expressed as the oxides of the magnesium, lithium and antimony, being between 20 and 60% of magnesium oxide (MgO), between 5 and 35% of lithium oxide ($Li_2O$) and between 30 and 70% of antimony trioxide ($Sb_2O_3$).

Preferably, the proportions of the elements present in the initial mixture, expressed as the oxides of the magnesium, lithium and antimony are between 25 and 40% of magnesium oxide, between 10 and 20% of lithium oxide and between 45 and 60% of antimony trioxide.

Also according to the present invention, an artificial luminescent material is provided comprising a matrix of the elements magnesium, lithium, antimony and oxygen, the proportions by weight of the metals present in the matrix, expressed as the oxides of the magnesium lithium and antimony being between 20 and 60% of magnesium oxide (MgO), between 5 and 35% of lithium oxide ($Li_2O$), and between 30 and 65% of antimony trioxide ($Sb_2O_3$), the matrix being activated by manganese or uranium or both.

For the purpose of calculating the proportions of the constituents present in the initial mixture it is regarded as comprising only the oxides of the magnesium, lithium and antimony e. g. even though the initial mixture includes one of the elements magnesium, lithium and antimony as one of its compounds which is decomposed to the oxide under the heat treatment.

Preferably, the proportions of the metals present in the matrix, expressed as the oxide of the magnesium, lithium and antimony are between 25 and 40% of magnesium oxide, between 10 and 20% of lithium oxide and between 45 and 60% of antimony trioxide.

The proportion of manganese or uranium or both present in the initial mixture or incorporated in the matrix may be between 0.000 and 10% by weight thereof.

Preferably, when both manganese and uranium are present in the initial mixture or incorporated in the matrix, the proportion by weight of manganese is not more than 0.5% and the proportion by weight of uranium is not more than 3%.

Preferably, compounds which are readily decomposed to the oxides are used, e. g. carbonates, hydroxides, acetates, oxalates. Compounds which are not so readily decomposed, e. g. sulphates or chlorides, may be used but the product tends to be sintered or even fused owing to the high temperatures which must be used. The temperatures at which the heat treatment is carried out will vary, at least to some extent, in accordance with the composition of the initial mixture. Thus, if the proportion of magnesium oxide is low a lower temperature must be used to avoid sintering or fusion than if the proportion of magnesium oxide is high.

Also, it is found that there is a tendency for some of the antimony to be lost by volatilisation and such loss is increased as the temperature of the heat treatment is raised. Some, or perhaps all, of the antimony is converted during the heat treatment to a higher valency state than the trivalent, but in our experiments this does not appear to have affected the brightness of the resulting luminescent materials. The proportions of the metals in the resulting luminescent materials can be determined by usual methods of chemical analysis, but it has been found difficult to determine the exact amounts of oxygen combined with the metals in the matrix. Preferably, the heat treatment is carried out at temperatures within the range of 700° C. to 1250° C., since the brightest luminescent materials (i. e. of highest luminescent efficiency) are obtained thereby.

When activated with manganese the material emits a deep red luminescence under excitation by ultra-violet light of, for example, wavelength 3650 or 2537 A. U.

When activated with uranium and excited as above, the material emits a green luminescence.

When activated with both uranium and manganese and excited as above, the material emits a luminescence of a colour which varies between green and red, depending on the relative proportions of the two activators incorporated in the matrix.

Methods of preparing luminescent materials in accordance with the invention will now be described, by way of example.

All the materials used in the preparation of the luminescent material should be of the high degree of purity which is recognised in the art to be necessary for the preparation of such materials.

Example 1

35 grms. of magnesium oxide, 37 grms. of lithium carbonate, 50 grms. of antimony trioxide and 0.1 grms. of manganese chloride are ball-milled together and the resultant initial mixture is heated at 1050° C. for 1 hour. When cool the product is ground and reheated for a further hour at 1050° C. The resultant luminescent material emits a deep red fluorescence when excited by ultra-violet light of wavelength 3650 or 2537 A. U.

Example 2

If the method of Example 1 is modified by replacing the manganese chloride in the mixture by 1 grm. of uranyl nitrate, the luminescent material obtained emits a green fluorescence under excitation by ultra-violet light of wavelength 3650 or 2537 A. U.

Example 3

If the method of Example 1 is modified by adding 4.2 grms. of uranyl nitrate to the initial mixture the luminescent material obtained emits a green fluorescence under excitation by ultra-violet light of wavelength 2537 A. U. and a yellowish fluorescence under excitation by ultra-violet light of wavelength 3650 A. U.

I claim:

1. A method of preparing an artificial luminescent material including the step of heat treating at a temperature in the range of 700° C. to 1250° C., an initial mixture comprising compounds of magnesium, lithium and antimony, said compounds being selected from the group consisting of the oxides and compounds convertible to the oxides, of said substances, and a compound of a substance selected from the group consisting of manganese, uranium, and manganese plus uranium, the proportions by weight of said compound in the initial mixture being between 0.001% and 10%, the proportion by weight of magnesium oxide, taken as MgO being between 20 and 60%, of lithium oxide, taken as $Li_2O$, being between 5 and 35%, and antimony oxide, taken as $Sb_2O_3$, being between 30 and 70%.

2. A method as claimed in claim 1, wherein the proportions by weight of the elements present in the initial mixture, expressed as the oxides of the magnesium, lithium and antimony, are between 25 and 40% of magnesium oxide, between 10 and 20% of lithium oxide and between 45 and 60% of antimony trioxide.

3. A method as claimed in claim 1, wherein both manganese and uranium are present in the initial mixture, the proportion by weight of manganese being between 0.001% and 0.5% and the proportion by weight of uranium being between 0.001% and 3%.

4. An artificial luminescent material when prepared by a method as claimed in claim 1.

References Cited in the file of this patent

Smith's College Chemistry, 1946, pp. 600–606.
Kroger: Some Aspects of the Luminescence of Solids, 1948, pp. 51, 55, 270, 271, 283, 284.